United States Patent [19]

Papenmeier

[11] 4,322,170
[45] Mar. 30, 1982

[54] APPARATUS FOR THE PREPARATION OF PVC-POWDER

[76] Inventor: Horst Papenmeier, Talweg 2, 5840 Schwerte, Fed. Rep. of Germany

[21] Appl. No.: 68,900

[22] Filed: Aug. 23, 1979

[30] Foreign Application Priority Data

Aug. 28, 1978 [DE] Fed. Rep. of Germany ....... 2837435

[51] Int. Cl.³ ............................................. B01F 13/10
[52] U.S. Cl. .................................... 366/141; 366/148; 366/155; 366/188; 366/229; 366/230; 366/235; 366/290
[58] Field of Search ........................ 366/76, 91, 14, 15, 366/141, 148, 154, 155, 187, 188, 220, 224, 225, 228, 229, 230, 233, 235, 290; 425/145, 148, 204, 205

[56] References Cited

U.S. PATENT DOCUMENTS

| | | | |
|---|---|---|---|
| 2,040,770 | 5/1936 | Grote | 366/76 X |
| 2,185,158 | 12/1939 | Price | 366/154 |
| 2,530,403 | 11/1950 | Seaman | 366/155 X |
| 2,646,170 | 7/1953 | Jackson | 366/188 X |
| 3,021,566 | 2/1962 | Sommer | 366/220 X |
| 3,216,345 | 11/1965 | Rigby et al. | 366/225 X |
| 3,337,907 | 8/1967 | Williams | 425/148 |
| 3,390,424 | 7/1968 | Fortune | 425/145 |
| 3,544,077 | 12/1970 | Van Elten | 366/187 |
| 3,730,486 | 5/1973 | Hayashi et al. | 366/290 X |
| 4,188,130 | 2/1980 | Engels | 366/228 |

Primary Examiner—Philip R. Coe

[57] ABSTRACT

The disclosure refers to a method and apparatus for the preparation of PVC powder and the processing thereof to form plastic products, with care being paid to the material and also energy-saving. The PVC powder with additives is brought very quickly to a temperature between 340° K. and 420° K. through frictional heat and is then further heated only with thermal energy, without intermediate cooling, to a temperature at which the mixture is still just pourable. It is then immediately fed to the further processing.

17 Claims, 5 Drawing Figures

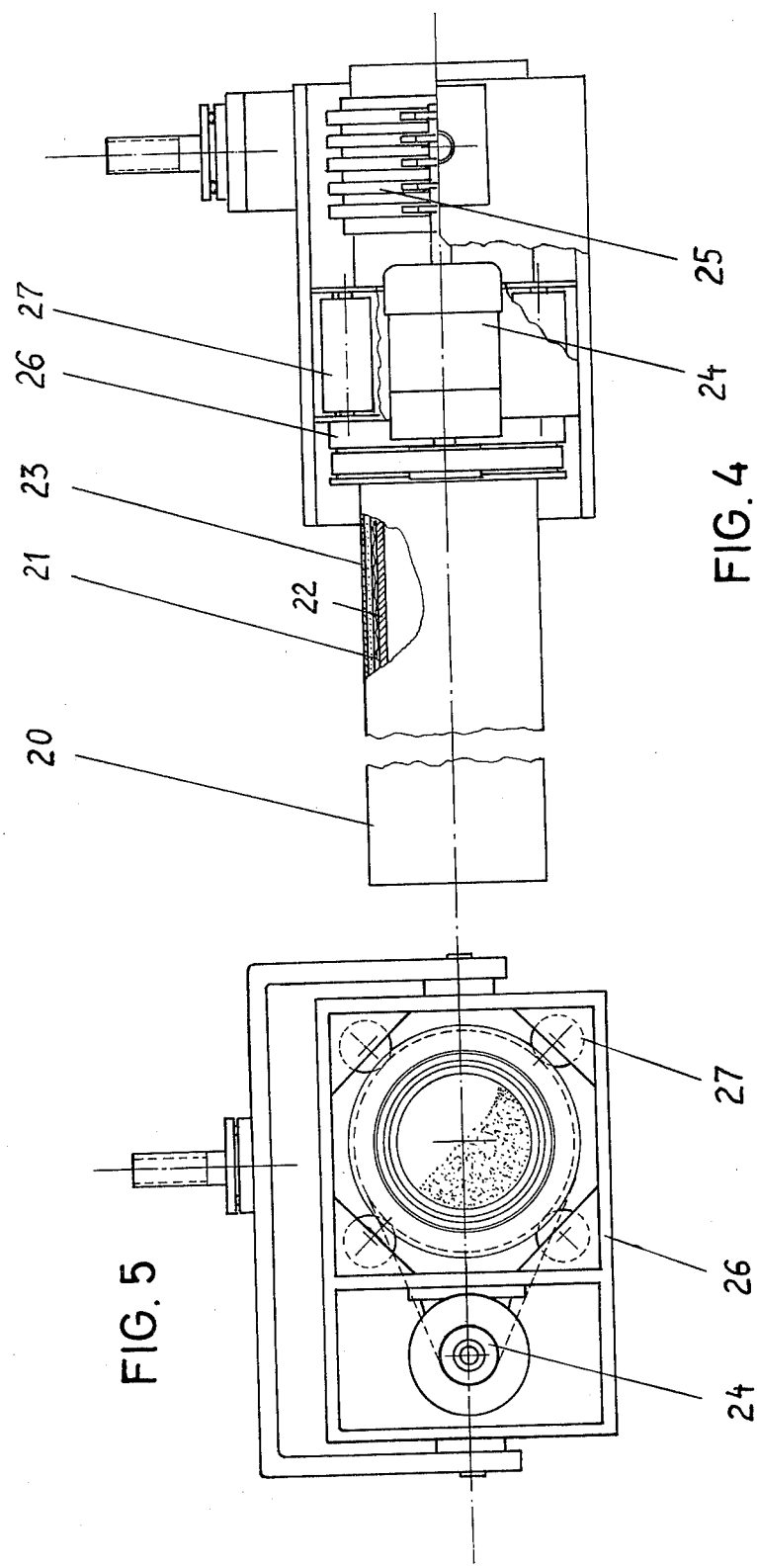

APPARATUS FOR THE PREPARATION OF PVC-POWDER

BACKGROUND OF THE INVENTION

Methods for the continuous preparation of pourable, particularly thermoplastically shapable, tempered material, in particular PVC powder mixture, for the so-called hot charging of processing machines are known. It is the purpose and aim of these known methods to use the thermal energy introduced into the material during the preparation to a dry blend or agglomerate as loss-free as possible by the immediately following further processing.

In the methods of this type being most customary today the heating of the material to be mixed to the necessary final preparation temperature during the mixing procedure is effected almost exclusively by means of the mechanical energy introduced into the material to be mixed by means of a rapidly running mixing tool in the so-called hot mixer or turbo mixer. However, methods are also known, in which the hot mixer has slowly running mixing tools, by means of which approx. only one third of the heat quantity enters the material to be mixed via mechanical energy, the remainder is introduced into the material to be mixed as thermal energy via the heated mixer wall. In these known methods a so-called heat retention mixer with additional heat exchange surfaces in the form of heatable coils, rings or ring segments is in rear position to this mixer. In this tempering or heat retention mixer a very slowly running mixing tool is rotated, which moves the material to be mixed past the inner surfaces of the container or the installations, rearranges the same constantly and thus keeps it at admission temperature. The outlet of this heat retention mixer is provided with a worm conveyor, which conveys the heated material into the processing machine.

Another known method uses three rapid mixers having approximately the same design, which have one rapidly running mixing tool each, one inlet each in the middle of the cover and one outlet each at the edge of the container and which are assembled in a stepped manner (German Pat. No. 1 778 436). The material continuously metered into the first mixer is also here heated by frictional heat. The warmer particles of the material are to rise towards above in the fluidized material and fall into the centre of the next mixer through the outlet. This procedure is repeated in the other mixers. A metering screw is connected to the outlet of the last mixer, which conveys the material thus heated in stages into the processing machine.

The disadvantages of this known process are that the introduction of heat into the bulk material by means of friction is relatively non-economical and that some raw materials do not withstand such violent treatment over a longer period of time without damage. A very essential disadvantage is furthermore that an especially uniform temperature distribution cannot be achieved within the material. However, said temperature distribution is in most cases indispensable in order to achieve a high quality in the product produced from this raw material. Thus it is e.g. necessary to keep the processing temperature $\pm 1°$ constant in the PVC during extrusion in the range of 458° K. in order to achieve maximum notched bar impact resistance. No such uniform temperature homogeneity can be achieved within the material with the known preparation methods that the above-mentioned temperature range can always be observed during extrusion. This is the reason why the above-described preparation methods did not prevail in practice. A homogenizing which can possibly be achieved by a long-lasting circulation of the material is out of the question in practice, since PVC can only be kept stable economically at high temperatures during a relatively short period of time.

Therefore one started to cool the PVC prepared to a dry blend again to room temperature and to supply the material without preheating to the further processing. However, then an extruder must e.g. be designed in such a manner that it alone undertakes the reheating of the material to the temperature necessary for extrusion. Such an extruder is relatively long and must have a relatively heavy construction. Analogous reflections apply to calendering and other processing machines. The described cooling must take place rapidly due to the limited period of time which PVC remains stable in hot state and thus requires the use of special devices.

Recently it has been discussed again to supply a repreheated raw material to the extruder during extrusion. It is obvious that here one is again confronted with the problem of temperature homogeneity, the maximum treatment time must be observed and that the process is rather energy-wasting.

SUMMARY OF THE INVENTION

The invention is based on the knowledge that it is only necessary for increasing the powder density of PVC to heat a mixture of PVC powder and waxes, which are always added to PVC powder to such an extent that the wax melts, so that it can spread over the PVC grains and glue the same with each other and with the remaining additives. It is not necessary to heat PVC to its softening temperature. The invention starts furthermore from the requirement that the total preparation time till a homogeneous temperature distribution is achieved, in so short that an addition of stabilizers can be restricted to an economic maximum. Due to the introduction of mechanical energy the material is only heated for such a period of time during which the sintered parts are not again destroyed due to the mechanical load. Due to the rapid heating by means of the introduction of mechanical energy considerable time can be saved, which shows itself in a reduction of the stabilizer requirements. Subsequently the further heating with simultaneous homogenizing of the temperature distribution by careful rearrangement of the material is exclusively effected by means of the introduction of thermal energy, when doing so the temperature is increased up to the limit of pourability of the material by means of a corresponding design of the devices used for this purpose. For this purpose certain maximum dumping heights must be observed so that the material does not cake under the pressure of its own weight. Then the material is heated to such a degree that a small pressure is sufficient for plasticizing it. Then an extruder only must have a short overall length. Since the material is supplied at a relatively high temperature, it can be expected that during the extrusion itself no vapours such as steam or monomers are set free from the material. For this and for the above-mentioned reason the extruder can be of a lighter design, which makes it possible to influence its temperature from the outside with rapid response, e.g. in order to bring it rapidly to the reference temperature after an interruption in operation. Such an extruder also has a long life, because the agglomerate filled into the same melts rapidly and lubricates the extruder.

In practice final temperatures between 340° K. and 420° K. come into consideration for the heating of PVC in the rapid mixer, the second heating stage then provides the remaining heating and at the same time the homogenizing of temperature distribution. The recooling of the material is not necessary.

It is a further advantage of the invention that the devices participating in the carrying out of the preparation and processing of PVC can be dimensioned more in accordance with their actual task, because they do not have to undertake any other tasks. A rapid mixer e.g., whose main task is the rapid heating of the PVC powder and the distribution of the waxes and other additives, if any, in the PVC powder, can be dimensioned with greater orientation towards this task neglecting the homogenizing problems. During the second heating stage the apparatus for this purpose must no longer carry out a thorough mixing, it must only introduce temperature into the material and distribute the temperature uniformly in the material by rearranging the material. A possibly rear-position extruder must no longer heat substantially, but it must mainly only extrude. As a whole, the individual devices are less complex.

A further advantage of the method of the invention is that the rapid mixer becomes again free for new batches relatively quickly or can be dimensioned relatively small. It is furthermore advantageous that no storage silo is required for dry blend. The apparatus expenditure taking the tempering drum into consideration is not greater than the apparatus expenditure, if a cooling mixer is taken into consideration. A special metering device can furthermore be omitted, since the drum itself can be used as metering device.

DESCRIPTION OF THE DRAWINGS

The invention will be explained in the following in more detail by means of an example of embodiment for an apparatus for carrying out the method with reference to the drawings:

FIG. 4 shows the rotary pipe with drive from the side, partly fragmented and

FIG. 5 shows the rotary pipe of FIG. 4 seen from the inlet side.

Figure 1:
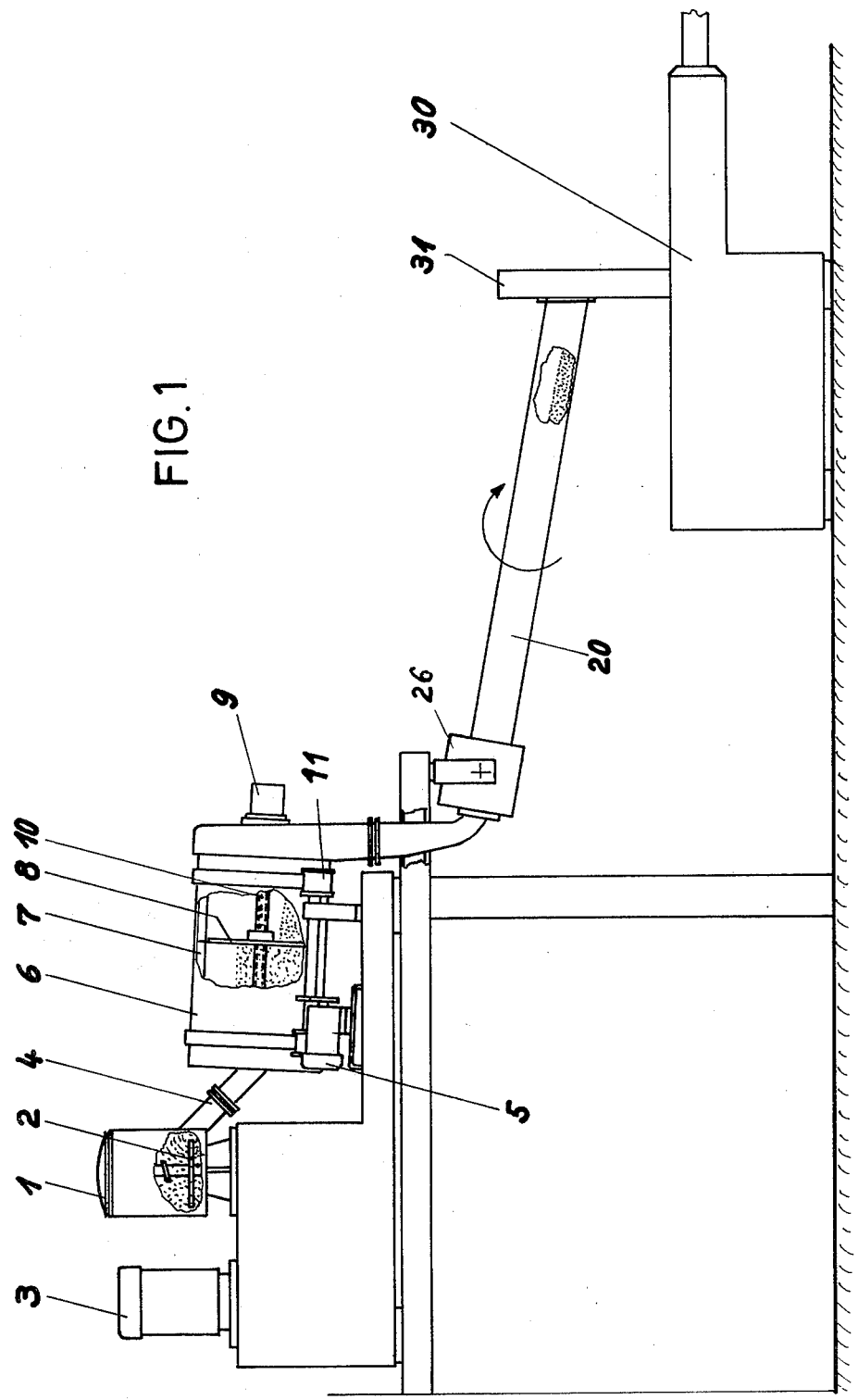
FIG. 1 shows an apparatus for carrying out the method.

The apparatus according to FIG. 1 consists of a rapid mixer 1 with a rapidly rotating mixing tool 2 which is driven by a motor 3, of a horizontally arranged heating drum 6, which is rotated by a motor 5 and of a rotating metering pipe 20 which is also tempered. The outlet of the metering pipe 20 is connected to the loading shaft 31 of a plastics processing machine, here e.g. an extruder 30.

The outlet of the rapid mixer is connected to the inlet of the heating drum 6 via a connecting line 4. The outlet of the heating drum opens into the inlet of the metering pipe 20.

The heating drum 6 fulfills several tasks at the same time. It is a heating device and a device for homogenizing the temprature distribution in the bulk material reaching its outlet. It is furthermore a buffer which produces a continuous discharge of the prepared material from the batch-wise supply from the rapid mixer 1 as it is necessary for rear-position processing machines, particularly extruders.

Figure 3:
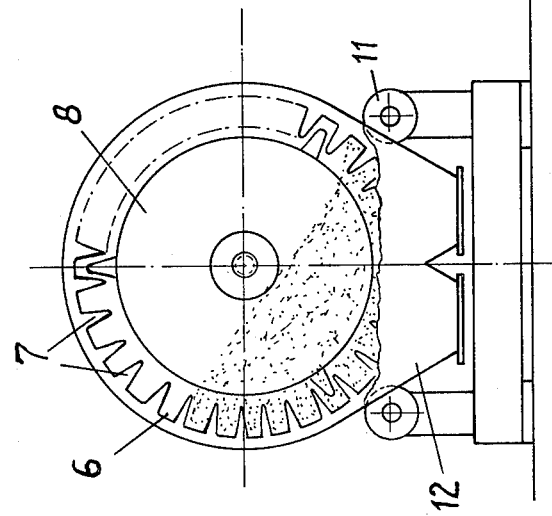
FIG. 3 shows the heating drum of FIG. 2 seen from the inlet side, partly in sectional diagram.

As is particularly revealed in FIGS. 1 and 3 the drum 6 is rotatably mounted on support rollers 11. The drum is situated at a level below the rapid mixer 1 so that the agglomerate delivered by the latter can get into the drum 6 by means of the effect of gravitational force. The supply into the drum 6 is effected at its axis. A cover 13 is arranged in a cover hood 12 at the other end of the drum 6, which is adjusted as regards the distance with respect to the drum by means of a handwheel 14 so that an opening of variable width results between the drum 6 and this cover 13. The cover hood 12 is provided with two outlets as this is shown by FIG. 3.

FIG. 3 reveals also that the drum 6 is provided with ribs 7 at its inside, which entrain the agglomerate better and offer larger tempering surfaces to the agglomerate. The drum itself is heated from the outside by means of hot air or hot vapour or its walls are interspersed by heating elements, which is however not represented here for reasons of clearness. The inner space of the drum is subdivided by retarding disks 8 according to FIGS. 1 and 2, which extend right up to the inner wall of the drum and encompass together with the same an annular opening. These retarding disks 8 are fastened to screw sockets, which are guided on a threaded spindle 10, which is rotatable with respect to the drum 6 by means of an adjustment drive 9, in order to axially adjust the retarding disks 8. Dogs which engage into the spaces between adjacent ribs 7 of the drum 6 serve as safety mechanism for the retarding disks 8 with respect to the drum 6.

A metering pipe 20 is connected to each of the outlets of the drum 6, one of which can be seen in FIG. 1. This metering pipe 20 is arranged in a slightly inclined manner and rotated so that the agglomerate contained in the same is moved to the outlet of the metering pipe 20 under the effect of gravitational force. There are no installations in the metering pipe 20 apart from the draw-in device, if any, on the inlet side.

According to FIG. 4 the metering pipe is a relatively thin-walled body, in whose walls electrical heating wires 21 are embedded which are covered by a protective layer 22 towards the interior of the pipe and which are protected against excessive heat loss by an insulating intermediate layer 23 towards the pipe wall. The metering pipe 20 is rotated by an electric motor 24. Collectors 25 serve for the power supply of the electrical heating wires 21. The total drive with the adjacent pipe end is fastened to a frame 26 which is suspended on gimbals in the machine frame. In this manner the metering pipe 20 can be pivoted and e.g. be pivoted over to another processing machine. Rolls 27 serve for the mounting of the metering pipe 20 within the frame 26. This suspension on gimbals has at the same time the advantage that, in the case of a correspondingly designed mounting of the other pipe end, the metering pipe can be used as metering scales, e.g. by having corresponding measuring probes engage the frame 26.

For the complying with the temperature conditions to be met by the prepared PVC it is advantageous or necessary to arrange corresponding temperature measuring probes at the drum 6 and at the metering pipe 20, which are connected to a control device, by means of which the heat supply via the drum or the metering pipe is influenced. Such measuring probes and the control means connected to the same are of a known type and are consequently not represented in the drawing and must not be explained in more detail.

The described apparatus operates as follows. A batch of PVC powder which contains at least also one wax is introduced into the rapid mixer and the rapid mixer is put into operation. It puts the batch into violent motion mixing the wax with the PVC powder and heating the mixer content due to the friction occurring between the same and the rotating vanes. This procedure is maintained till the grains of the PVC powder are coated with a wax layer due to the melting of the wax and cake to more or less large agglomerates due to the adhesive effect of the wax. In the case of a suitable design and filling of the rapid mixer this procedure can be terminated within one to three minutes. This period of time is thus considerably below the customary treatment time of PVC powder in a so-called rapid or turbo mixer.

Figure 2:
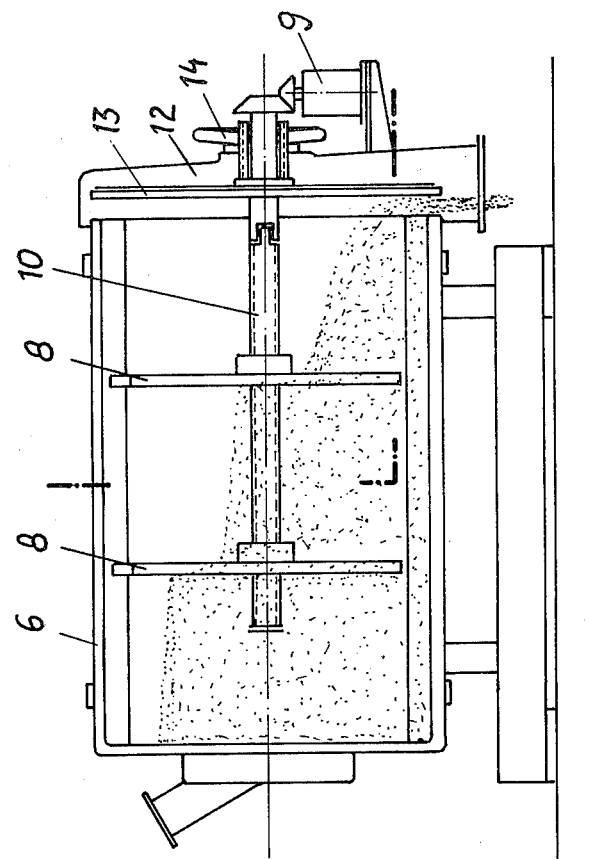
FIG. 2 shows the heating drum of the apparatus according to FIG. 1 in longitudinal section.

After the opening of a corresponding slide the agglomerated product in the thus preheated state gets into the rotating heating drum 6 through the connecting pipe 4, viz. into the partial chamber divisioned off by a retarding disk 8 and being on the left in FIG. 2. The agglomerate fays at the walls and in the pockets between the ribs 7 of the heating drum 6. Due to the rotation of the drum the agglomerate is continuously rearranged so that a uniform distribution of the heat transferred by the walls to the agglomerate takes place in the agglomerate. Due to the movement of the drum the agglomerate is pressed gradually through the opening between the retarding disk 8 and the wall of the drum into the next partial chamber, in which it is further heated. An inclination of the drum in the outlet direction supports this conveying movement. The same is repeated at the next retarding disk 8 located on the right, which divisions off the central partial chamber of the drum 6 from the right partial chamber on the outlet side. It is achieved by means of the retarding disks that there are various dumping heights of the agglomerate in the various partial chambers, which take the increase in temperature in the agglomerate from the inlet to the outlet at least roughly into account so that cakings cannot occur in the material under the influence of its own weight. These retarding disks make it also possible to provide the drum 6 with a new batch from the rapid mixer 1, even if the preceding batch has not left the drum 6 completely. The first partial chamber isolates the fresh batch from the portions of the preceding batch, which have already a homogeneous temperature to a great extent.

It must be emphasized that the retarding disks 8 can be possibly displaced along the axis of the drum during the processing of a batch, in order to take e.g. into account the filling of the first partial chamber with a new charge and to be able to offer sufficient space there. In this case the first partial chamber is enlarged prior to the admission of the new batch and gradually reduced in size again after the admission of the batch in order to make more room in the following batches, in order to obtain lower filling heights there in accordance with the increasing temperature in the bulk material. Corresponding reflections apply also to the other retarding disk.

The PVC material prepared and continuously discharged by the drum 6 gets into the metering pipe 20 through the outlet, in which its temperature can be maintained or possibly even increased to a certain extent. The dumping height is small in the metering pipe 20 in accordance with the relatively high temperature of the prepared PVC material. Due to the relatively large length of the metering pipe 20 a continuous flow of material can be obtained at its outlet, which is adapted to the capacity of a subsequent processing machine. Due to the large length of the metering pipe 20 a very great homogenizing of the temperature within the conveyed PVC material can be obtained. Irregularities in the dumping can be compensated by changing the speed of the driving motor. It is understood that the requirement of material per unit of time of a processing machine must be in keeping with the average feed of the rapid mixer 1 and that a speed control of the driving motors 5 and 24 of drum 6 and metering pipe 20 can only serve to homogenize the dumping at the outlet of the metering pipe 20.

As already mentioned the metering pipe 20 need not have any installations, i.e. it can be completely smooth in the inside so that it can be cleaned very easily, which is an essential advantage, if caking in the pipe should occur e.g. after breakdowns. Corresponding reflections apply to the heating drum 6, from which the retarding disks can also be simply axially removed after the removal of the cover hood and the cover so that the interior of the drum is easily accessible for cleaning.

Thanks to the method of the invention a temperature homogeneity in the prepared PVC material is already achieved at the outlet of the heating drum 6, which permits the connection of a processing machine, e.g. an extruder, directly to the outlet of the drum 6, i.e. the use of a metering pipe 20 can be renounced. As already mentioned the metering pipe 20 has mainly the task to achieve a large homogenizing of the dumping, because it provides an additional regulating component. Where this additional component is not urgently required, the metering pipe 20 can be omitted.

What is claimed is:

1. Apparatus for preparing material used in the production of plastic products, for example products extruded from a mixture of PVC powder and additives, said apparatus comprising the combination of:
    a first drum including an internal vane that is arranged to contact the material to be prepared and outlet means for discharging the contents of said first drum;
    drive means coupled to said vane for the rotation thereof whereby the material that comes in contact with said vane is frictionally heated;
    a second, elongated drum having inlet means proximate one end thereof for receiving the frictionally heated material that is discharged from said first drum and outlet means proximate the opposite end thereof;
    means for rotating said second drum about the longitudinal axis thereof;
    means for uniformly applying heat directly to the contents of said second drum prior to the discharge of the contents therefrom; and
    an elongated metering pipe having a first end thereof coupled to said outlet means of said second drum and a second end adapted to be coupled to a utilization device such as an extruder, said first end of said metering pipe being at a higher elevation than said second end thereof, there being further included means for rotating said metering pipe about the longitudinal axis thereof and means for applying heat to the interior of said metering pipe.

2. The apparatus according to claim 1 wherein there is further included means for changing the rotational speed of said metering pipe.

3. The apparatus according to claim 1 wherein there is further included means for pivoting said metering pipe whereby the location of said second end thereof is changed.

4. The apparatus according to claim 1 wherein said metering pipe functions as a metering scale.

5. The apparatus according to claim 1 wherein said metering pipe further includes a draw-in device at said first end thereof.

6. The apparatus according to claim 1 wherein said second drum is rotated relatively slowly as compared to the rate of rotation of said vane.

7. The apparatus according to claim 1 wherein the longitudinal axis of said second drum is inclined with respect to a horizontal plane and wherein said inlet means of said second drum is at a higher elevation than said outlet means thereof.

8. The apparatus according to claim 7 wherein there is further included means for changing the inclination of the longitudinal axis of said second drum.

9. The apparatus according to claim 1 wherein there is further included at least one retarding disk within said drum, the periphery of said disk defining an annular opening in combination with the interior wall of said second drum.

10. The apparatus according to claim 9 wherein there is further included means for changing the axial location of said disk.

11. The apparatus according to claim 9 wherein there are a plurality of said disks.

12. The apparatus according to claim 11 wherein there is further included means for changing the axial location of said disks.

13. The apparatus according to claim 1 wherein there is further included means for changing the rotational speed of said second drum.

14. The apparatus according to claim 1 wherein there is further included a metering device that cooperates with said outlet means of said second drum.

15. The apparatus according to claim 14 wherein said metering device comprises a cover positioned in opposition to said outlet means of said second drum and means for varying the spacing between said cover and said outlet means of said second drum.

16. The apparatus according to claim 1 wherein said inlet means of said second drum is at a lower level than said outlet means of said first drum whereby the contents of said first drum is discharged into said second drum by gravitational force.

17. The apparatus according to claim 1 wherein the inside surface of said second drum is provided with the plurality of angularly spaced apart, axially extending ribs.

* * * * *